(12) United States Patent
Kela et al.

(10) Patent No.: US 6,950,680 B2
(45) Date of Patent: Sep. 27, 2005

(54) ELECTRONIC DEVICE

(75) Inventors: Jukka Kela, Hellerup (DK); Stefan Olsen, Bronshoj (DK); Helle Baarup Lundsgaard, Copenhagen (DK)

(73) Assignee: Nokia Corporation, Espoo (FI)

( * ) Notice: Subject to any disclaimer, the term of this patent is extended or adjusted under 35 U.S.C. 154(b) by 254 days.

(21) Appl. No.: 09/953,558

(22) Filed: Sep. 17, 2001

(65) Prior Publication Data

US 2003/0054854 A1 Mar. 20, 2003

(51) Int. Cl.⁷ .................................................. H04M 1/00
(52) U.S. Cl. ..................... 455/566; 455/550.1; 345/901; 345/905
(58) Field of Search .............................. 455/550.1, 566, 455/556.1, 556.2, 575.1, 575.8; 362/24; 345/168, 169, 170

(56) References Cited

U.S. PATENT DOCUMENTS

| | | | |
|---|---|---|---|
| 4,124,879 A | * | 11/1978 | Schoemer .................... 362/26 |
| 4,755,035 A | | 7/1988 | Kopish et al. |
| 5,075,824 A | | 12/1991 | Tan |
| 6,040,822 A | * | 3/2000 | Decker ........................ 345/168 |
| 6,073,034 A | * | 6/2000 | Jacobsen et al. ............ 455/566 |
| 6,217,185 B1 | * | 4/2001 | Feger et al. .................. 362/31 |

* cited by examiner

*Primary Examiner*—Nick Corsaro
*Assistant Examiner*—Angelica M. Perez
(74) *Attorney, Agent, or Firm*—Antonelli, Terry, Stout and Kraus, LLP.

(57) ABSTRACT

An electronic device is disclosed and comprises: a display (5); a keypad (4,42); a light source (28) associated with the display (5); and a substrate (30) to receive the display (5) and the keypad (4) and having a wedge shaped portion formed from a light transmitting material in a region beneath the keypad (4) such that light emitted by the light source (28) is transmitted through the substrate (30) and is out-coupled from the substrate (30) via the wedge shaped portion to illuminate the keypad (4). The electronic device of the invention is preferably a mobile telephone (1).

16 Claims, 5 Drawing Sheets

ELECTRONIC DEVICE

BACKGROUND OF THE INVENTION

1. Field of the Invention

The present invention relates to an electronic device incorporating an electronic display, a keypad and ox more sources of light for illuminating the display and the keypad. In particular, the electronic device to which this invention relates is a mobile telecommunications device such as a telephone but it could also include any other type of electronic device that incorporates a keypad and an electronic display including, for example; a personal data assistant (PDA) or other electronic device such as a television/stereo remote control unit. For ease of understanding, the invention will be described hereinafter in its application to a mobile telephone.

2. Description of the Prior

A conventional mobile telephone includes an electronic display such as an LCD and a keypad. The keypad includes a plurality of keys formed on a flexible mat which are accessible through apertures in the front cover of the mobile telephone, and a key pad membrane attached to a substrate beneath the keys. The key pad membrane has a pin or other protuberance located beneath each key which deforms a conductive element into contact with a printed circuit board situated beneath the substrate when the key is depressed. An electrical circuit is thereby closed and the selected function is performed. One ox more light sources such as LFD's are located adjacent to the display around its periphery and in the vicinity of the keypad so that the display and the key pad are illuminated when the telephone is in use. At least a portion of each key is formed from a translucent or light transmitting material so that they are visibly illuminated from the front.

A problem with this known arrangement is that a relatively large number of LED's or other light sources are required between the keys and surrounding the display to ensure that a uniform or homogeneous lighting effect is created: over the whole keyboard as well as the display. Furthermore, "hot-spots" or regions of the display and keypad which are illuminated to a greater intensity than other regions ale often produced in the immediate vicinity of the light sources. Not only do the LED's and their associated circuitry take up more space within the telephone but its manufacture is more complicated, it is heavier and battery life is reduced due to an increase in power consumption.

Attempts have been made to overcome the aforementioned problem by reducing the number of light sources positioned beneath the keys and instead relying on the light sources surrounding the periphery of the display to illuminate both the display and the keypad. This has been achieved by incorporating lenses, other optical devices or light scattering surfaces in the telephone casing around the keypad so that part of the light matted by the light sources is out-coupled to the keypad thereby illuminating both the display and the keypad. However, it has been found that this solution is unsatisfactory as the intensity of the light noticeably reduces with distance away from the light source resulting in a non-uniform lighting effect across the keypad.

Another problem with conventional mobile telephones is that due to the close proximity of the keys and the printed circuit board, high stresses are created in the printed circuit board when excess pressure is applied to the keys which may occur when, for example, a user is playing a game or writing a text message. This can eventually cause damage to the printed circuit board and malfunction of the telephone.

U.S. Pat. No. 4,755,035 discloses a display assembly for an LCD in which the LCD element is mounted on the top surface of a carrier made from light transmitting material. A point light source is positioned adjacent to the carrier so that light emitted from the source is transmitted through the carrier to backlight the display. The carrier is wedge shaped to ensure uniform backlighting across the LCD.

U.S. Pat. No. 5,075,824 discloses as LCD/light wedge module in which an LCD is received in a pocket of a wedge shaped carrier. The carrier has a pair of openings to receive point light sources so that light emitted from the sources is directed onto the slanted rear surface of the wedge and is reflected towards the LCD so as to provide a more uniform backlighting effect across the LCD.

U.S. Pat. Nos. 4,755,035 and 5,075,824 both disclose arrangements for providing a more uniform backlighting effect across an electronic display. However, neither document discloses an arrangement in which the light source is configured to illuminate both the display and a keypad with a more uniform light.

SUMMARY OF THE INVENTION

The present invention is to overcomes or substantially alleviate the problems with the conventional electronic devices discussed above.

According to the invention, there is provided an electronic device comprising: a display; a keypad; a light source associated with the display; and a substrate to receive the display and the keypad and having a wedge shaped portion formed from a light transmitting material in a region beneath the keypad such that light emitted by the light source is transmitted through the substrate and is out-coupled from the substrate via the wedge shaped portion to illuminate the keypad.

In a preferred embodiment, the upper surface of the substrate on which the keypad is mounted is substantially planar.

Preferably, a portion of the underside of the substrate in a region where the key pad is mounted is inclined at an angle relative to the upper surface to form the wedge shaped portion of the substrate.

Preferably, a substantially planar electrical contact sheet is disposed beneath the substrate, a wedge shaped gap being formed between the wedge shaped part of the substrate and the upper surface of the electrical contact sheet.

The electronic device conveniently includes a retaining member to mount the display on the substrate.

The upper surface of the electrical contact sheet is preferably covered with a reflective material or coating.

Preferably, the electronic device of the invention is a mobile telecommunications device.

DETAILED DESCRIPTION OF A PREFERRED EMBODIMENT

An embodiment of the invention will now be described, by way of example only, with reference to the accompanying drawings.

Figure 1:
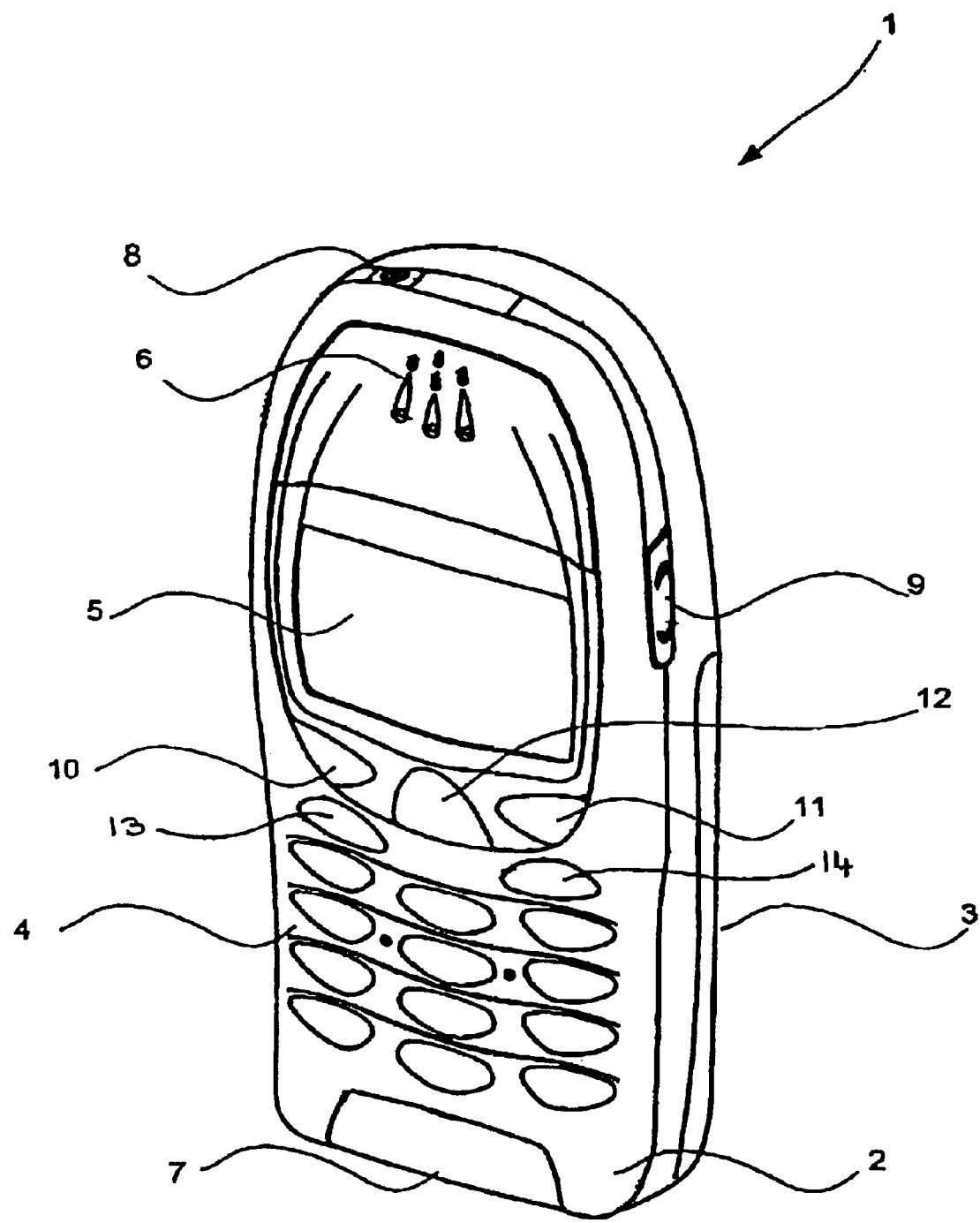
FIG. 1 illustrates a mobile telephone according to a preferred embodiment of the invention.

The preferred electronic device to which this invention is applicable is a mobile telephone such as that illustrated in FIG. 1. The telephone 1 has a front casing portion 2 and a rear casing portion 3. A user interface is provided in the front casing portion 2 and comprises a key pad 4, an electronic display 5, an ear-piece 6, a microphone 7, an on/off key 8 and a scroll key 9 for highlighting a particular item in a menu to enable its selection or for controlling the volume of the sound emitted through the ear-piece 6. The telephone 1 is adapted to enable communication via a wireless telecommunications network, e.g. a cellular network. However, the telephone 1 could also be designed for a cordless network.

The keypad 4 has a first group of keys which are alphanumeric to enable a user to enter a telephone number, write a text message (SMS) or enter a name associated with a particular number, etc. The keypad 4 additionally includes five soft keys 10,11,12,13,14. The first soft key 10 is used to access the menu structure and to select a function in the menu. Its function changes depending on the status of the telephone 1. The second soft key 11 is used to scroll up and down in the display whilst the telephone 1 whilst a menu is displayed. It is also used to access the first entry in the phonebook when the telephone 1 is in a starting position and is ready for use. The third soft key 12 is used to enter the phonebook options when the telephone 1 is in the starting position. However, when in the menu structure, the third soft key 12 is used to close the menu structure or erase entered characters. The fourth and fifth soft keys 13,14 are call handing keys. The first call handling key 13 is used to start a call or establish a conference call and the second call handling key 14 is used to end a conference call or reject an incoming call.

Figure 2:
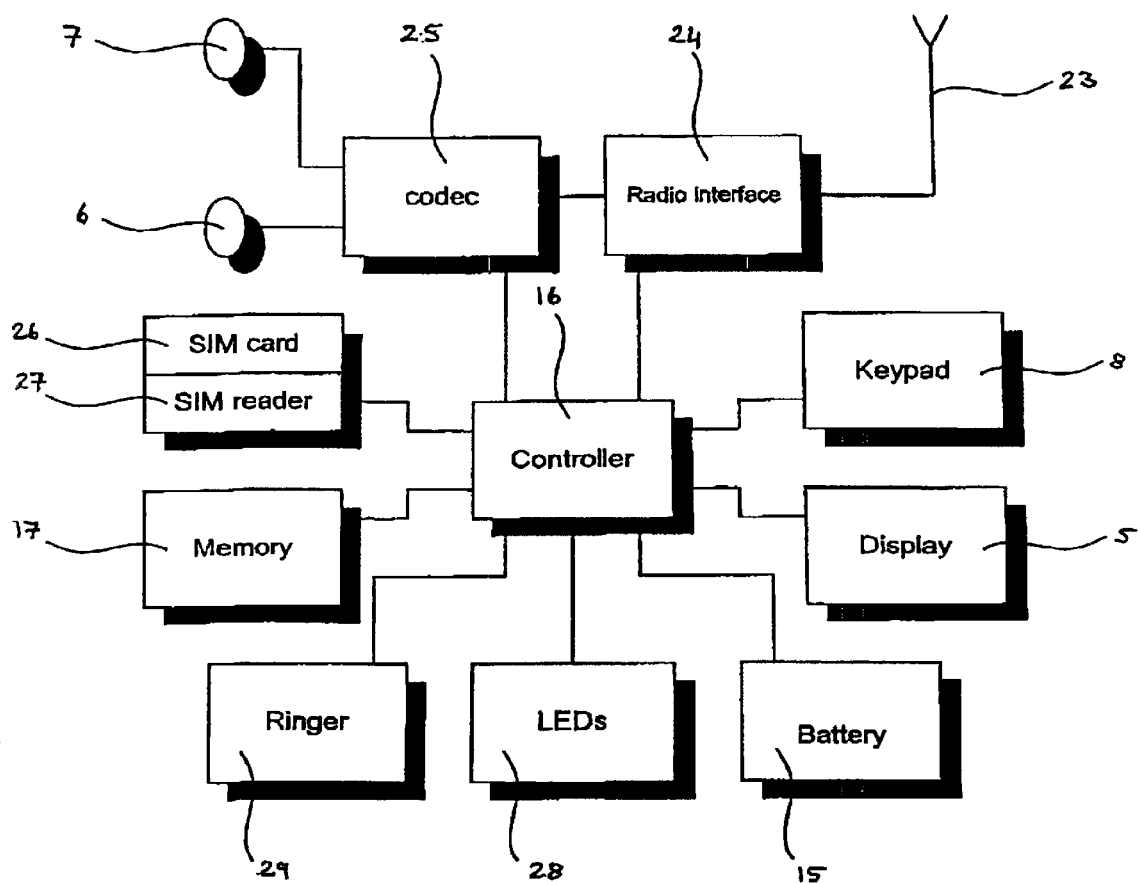
FIG. 2 illustrates a schematic representation of the electronic components of the mobile telephone shown in FIG. 1.

FIG. 2 shows a schematic representation of the main components of the mobile telephone illustrated in FIG. 1. The telephone is powered by a removable battery pack 15. Signal processing is carried out under the control of a digital microcontroller 16 which has an associated RAM/ROM and flash memory 17. Electric analogue signals are produced by microphone 7 and are fed to ear piece 6. The controller 16 receives instruction signals from the keypad 4 including the soft keys 10,11,12,13,14 and controls the operation of the display 5. Radio signals are transmitted and received by means of an antenna 23 connected through a radio interface 24 to a codec 25 configured to process signals under control of the controller 16. Thus, in use, for speech, the coder 25 receives analog signals from the microphone 7, digitizes them into a form suitable for transmission and feeds them to the radio interface 24 for transmission through antenna element 23 to the public land mobile network (PLMN). Similarly, received signals are fed to codec 25 so as to produce analogue signals which are fed to the ear piece 6. The telephone 1 also includes a subscriber identification module (SIM) card 26, a SIM card reader 27, light emitting diodes (LEDs) 28 and a ringer 29. The individual circuits and elements are of a type well known in the art, for example, in the Nokia range of mobile telephones.

Figure 3:
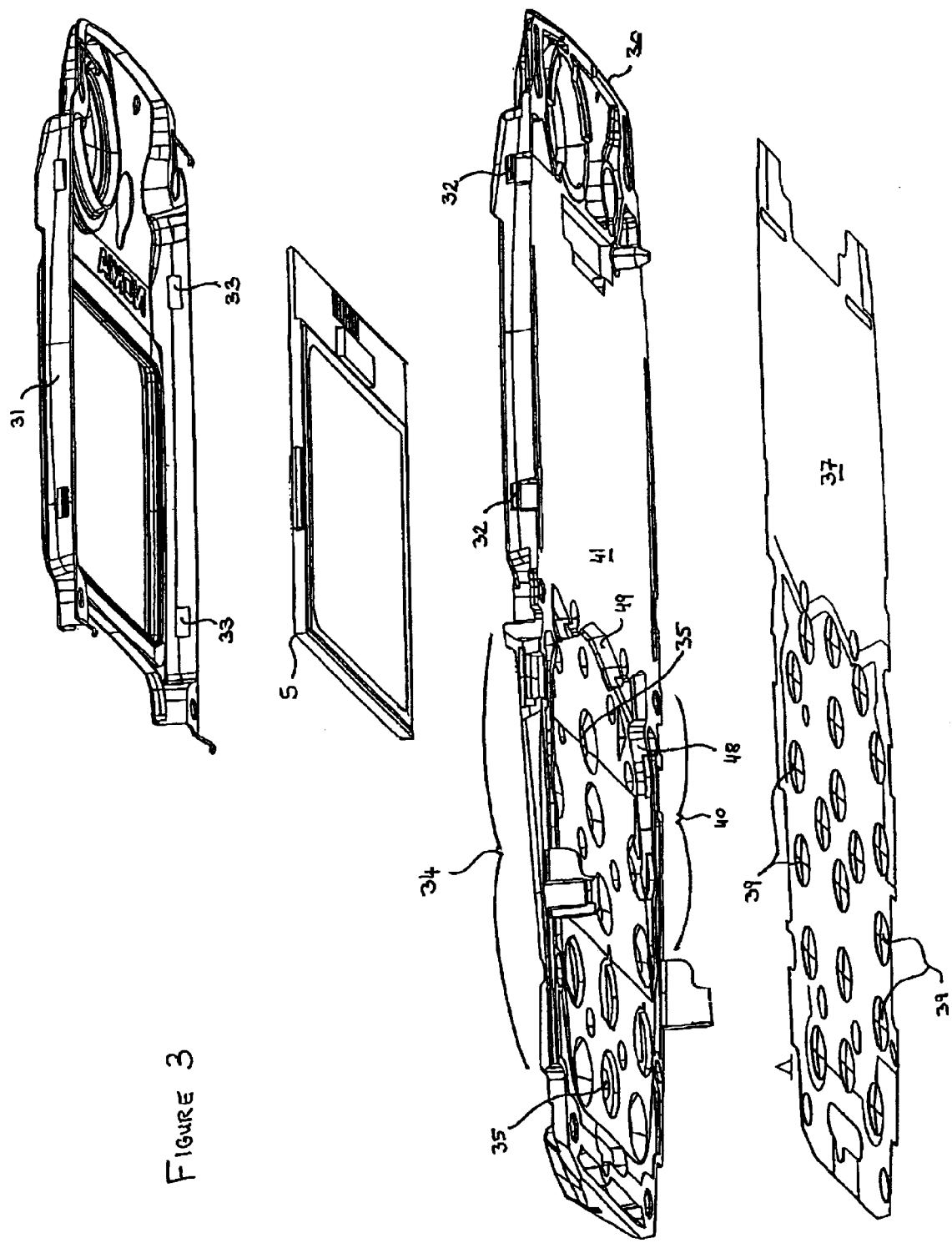
FIG. 3 illustrates an exploded perspective view of a portion of the actual front cover, the display, the substrate and the printed circuit board of the mobile telephone shown in FIG. 1.
Figure 4:
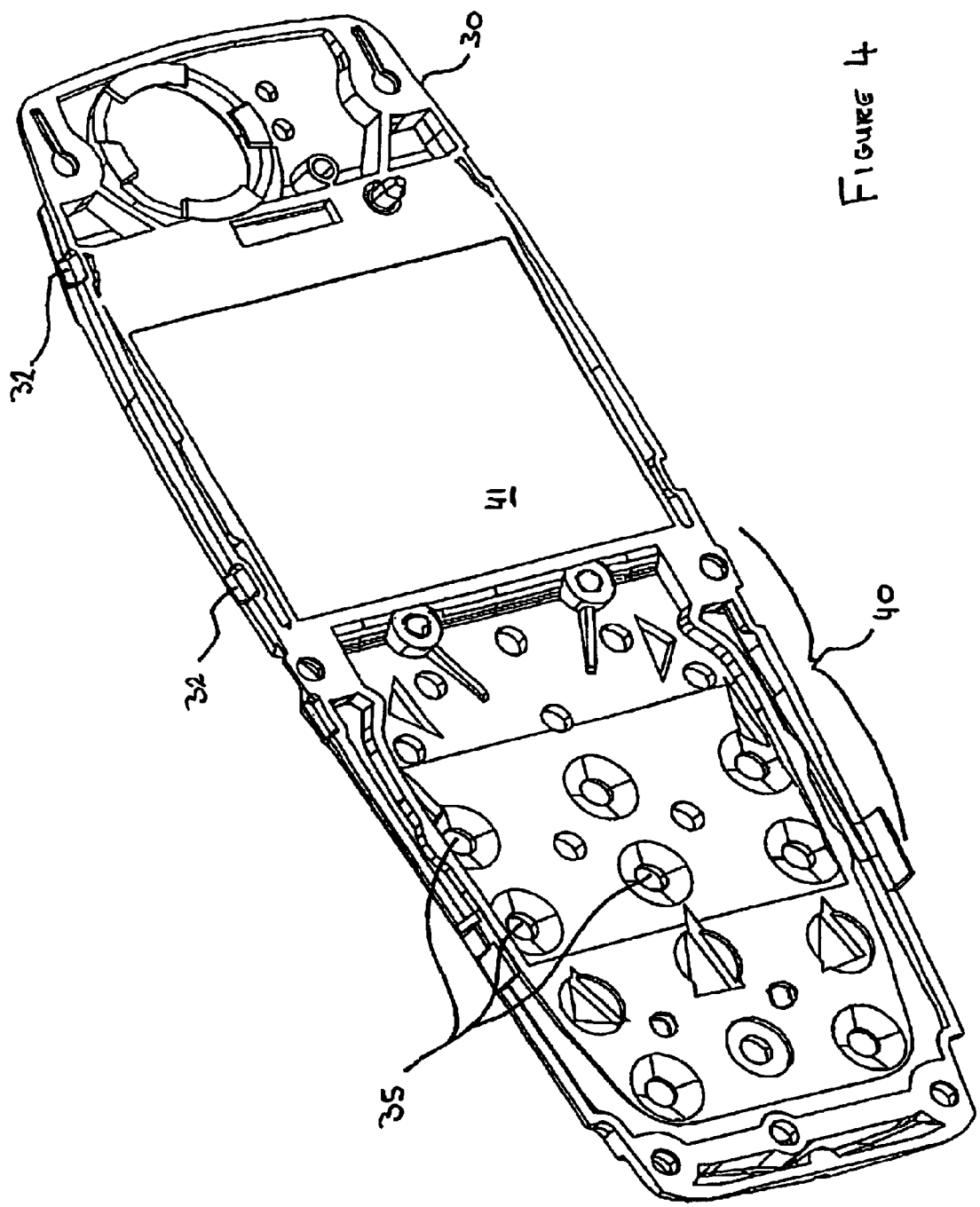
FIG. 4 illustrates a perspective view of the rear of the substrate with the mounting pins inserted therein.
Figure 5:
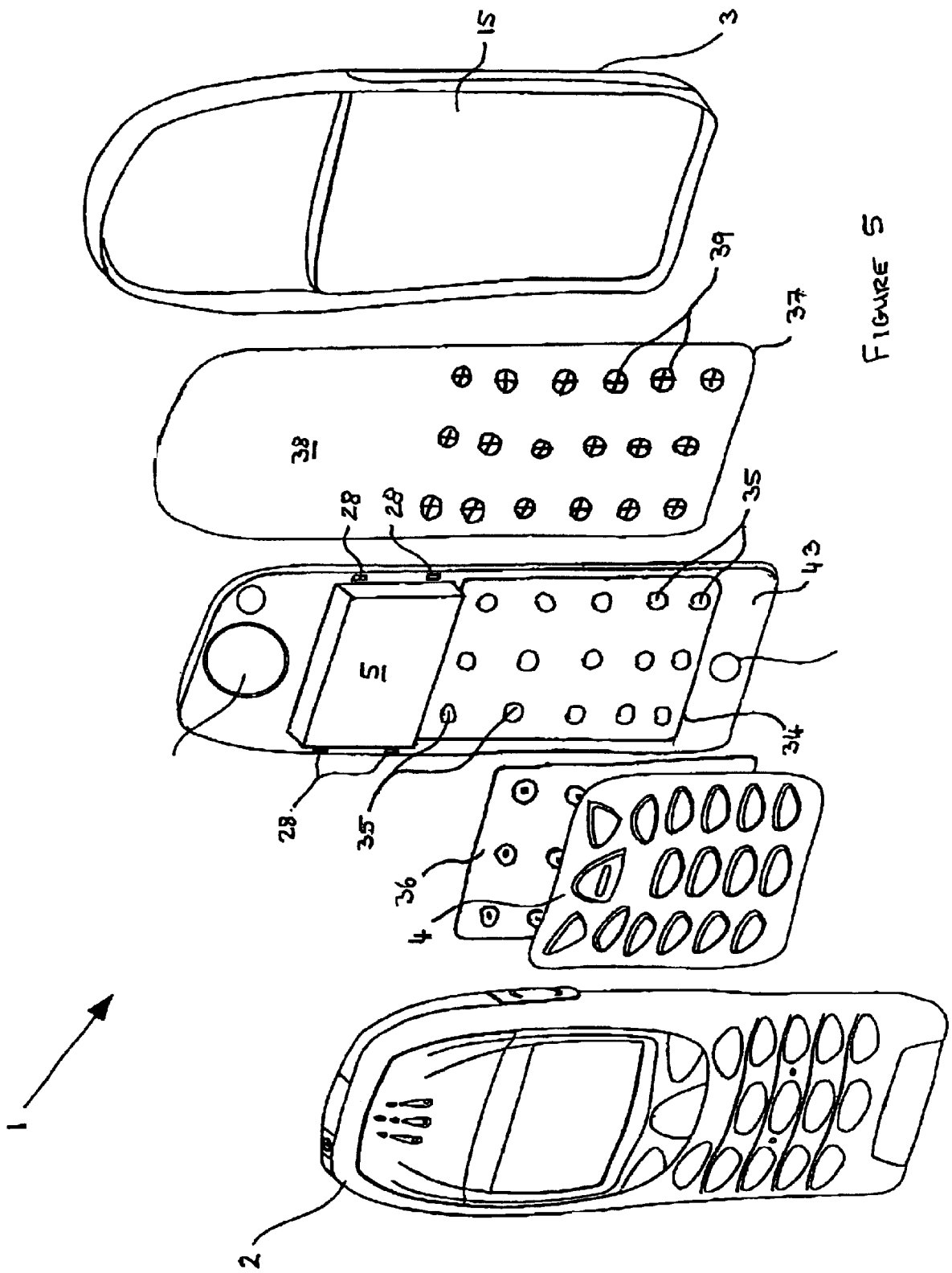
FIG. 5 illustrates a highly simplified exploded perspective view of the mobile telephone shown in FIGS. 1, 3 and 4.

Referring now to FIGS. 3 to 5, it can be seen that the display 5 comprises a generally planar module which is mounted to a substantially planar portion of a substrate 30 by a mounting frame 31 which secures the display 5 to the substrate 30. A number of raised projections 32 protrude from the peripheral edge of the substrate 30 each of which engage in a co-operating recess 33 in the mounting frame 31. The substrate 30 includes an integrally formed region 34 having a substantially planar upper surface 43 to receive the key pad 4 adjacent to the display 5. This region 34 has a plurality of apertures 35 (see FIG. 4) therein corresponding to the position of each key and a key pad membrane 36 (see FIG. 5) is attached over this region 34. The key pad membrane 36 may be integrally formed with the key pad 4.

An electrical contact sheet 37 is disposed beneath the substrate 30 and has a reflective upper surface 38 to reflect light emitted by the LED's 28 toward the substrate 30. The electrical contact sheet 37 also has a plurality of resiliently deformable electrically conductive metal domes 39, each dome 39 being positioned beneath a key formed on the key pad 4 and its associated aperture 35 in the substrate 30. Each key of the key pad 4 or key pad membrane 36 is provided with a pin (not shown) so that, when a key is depressed, the pin associated with that key passes through its associated aperture 35 in the substrate 30 into contact with a dome 39. Further depression of the key causes that dome 39 to resiliently deform and contact a printed circuit board (not shown) positioned beneath the sheet 37 thereby forming an electrical connection so that the required function is performed. When pressure on the key is released, the dome 39 returns to its original non-depressed state due to its resilient nature, thereby terminating the electrical connection. The majority of the electronic components including the microphone 7, the ear-piece 6 and the light emitting diodes 28 are mounted on the printed circuit board and are electrically connected thereto. The LEDs or other light sources 28 axe located on the substrate 30 around the periphery of the display 5 (see FIG. 5) so as to illuminate the display 5.

At least a portion 40 of the underside surface 41 of the substrate 30 in the region 34 that receives the key pad 4 and keypad membrane 36 is formed at an angle relative to its upper, substantially planar surface 43 so that a wedge shaped gap is created between the underside surface 41 of the substrate 30 and the contact sheet 37 in the region 34. It will also be appreciated that the substrate 30, which has a substantially planar upper surface 43, is also wedge shaped due to the angled underside surface of the substrate 30, for reasons that will now be explained.

The wedge shaped part of the substrate 30, or the whole substrate 30, is formed from a light transmitting material so that it acts as a light guide to direct light emitted from the LEDs 28 adjacent to the display 5 toward the key pad 4 so as to illuminate both the key pad 4 and the display 5. As the substrate 30 is wedge shaped, the intensity of the light out-coupled through the lightguide is more uniform over the whole keypad 4. When light propagates through the substrate 30, those light rays which meet the interface between the substrate 30 and the surrounding air at a small angle are reflected back rather than being out coupled from the substrate 30. In this ways the light travels through the substrate 30 having been reflected a number of times when incident on the interface between the substrate and the surrounding air. When the rays pass through the wedge shaped portion, the angle at which the rays meet the interface become steeper and steeper due to the changing angle that the rays meet the interface due to the wedge shape. Finally, a critical angle is exceeded and, instead of being internally reflected, the light is out coupled from the substrate 30. As some of the light rays travel through the substrate 30 and are reflected internally a number of times before being out coupled, even the regions of the keypad which are sore distance away from the light source are illuminated uniformly. It will be appreciated that this uniform lighting effect is achieved with a fewer number of LEDs than is normal, as the LEDs surrounding the display can be used to uniformly light both the display 5 and the keypad 4.

In addition to providing an homogenous keypad light with fewer light sources 28, the wedge shaped part of the substrate 30 provides the substrate 30 with increased mechanical stability and increases the distance between the substrate 30, the contact sheet 37 and the printed circuit board due to the wedge shaped hollow gap created between the wedge shaped portion of the substrate 30 and the contact sheet 37. This increase in distance reduces the stresses on the printed circuit board caused by heavy key presses such as those which may be made when playing a game or writing a text message on the telephone 1. Also, because the gap is wedge shaped, the keys at one end of the keypad 4 adjacent to the display 5 are positioned further away from the printed circuit board than those at the other end. Therefore, it is preferable to program the keys closest to the display 5 with the game controls so that the stresses produced in the printed circuit board 36 from multiple presses of these keys is minimized.

The underside of the substrate 30 can be seen more clearly in FIG. 3 from which it will be appreciated how, when the contact sheet 37 is put in place, the hollow wedge shaped gap is created between the contact sheet 37 and the wedge shaped portion of the substrate 30. The wedge shaped gap is enclosed by walls 48, 49 formed by the substrate 30 that extend between the contact sheet 37 and the wedge shaped portion.

It will be appreciated that the illustration shown in FIG. 5 is highly simplified and is included for ease of understanding only. From FIG. 5 it can be clearly seen that the display 5 is mounted on the substrate 30 which has a substantially planar upper surface 43. It can also be seen that the keypad membrane and keypad are mounted on the substrate 30 adjacent to the display 5.

Many modifications and variations of the invention falling within the terms of the following claims will be apparent to those skilled in the art and the foregoing description should be regarded as a description of the preferred embodiments only.

What is claimed is:

1. An electronic device comprising:
    a display;
    a keypad;
    a light source associated with the display; and
    a substrate having an integrally formed wedge shaped portion, the display and the keypad being mounted on the substrate so that the wedge shaped portion is located in a region beneath the keypad such that light emitted by the light source is transmitted through the substrate and is out-coupled from the substrate via the wedge shaped portion through an air interface between the substrate and the keypad to illuminate the keypad; and wherein
    the wedge shaped portion of the substrate interrally reflects at least some of the light incident on the air interface before being out coupled from the substrate.

2. An electronic device according to claim 1, wherein an upper surface of the substrate on which the keypad is mounted is substantially planar.

3. An electronic device according to claim 2, wherein a portion of the underside of the substrate is inclined at an angle relative to the upper surface to form the wedge shaped portion of the substrate.

4. An electronic device according to claim 3, wherein a substantially planar electrical contact sheet is disposed beneath the substrate a wedge shaped gap being formed between the wedge shaped portion of the substrate and the upper surface of the electrical contact sheet.

5. An electronic device according to claim 4, wherein the electronic device includes a retaining member to mount the display on the substrate.

6. An electronic device according to claim 4, wherein the upper surface of the electrical contact sheet is covered with a reflective material.

7. An electronic device according to claim 1, comprising a mobile telecommunications device.

8. An electronic device according to claim 5, wherein the upper surface of the electrical contact sheet is covered with a reflective material.

9. An electronic device according to claim 1 wherein:
    after internal reflection, the internally reflected light exceeds a critical angle within the wedge and passes through the air interface to illuminate the keypad.

10. An electronic device according to claim 2 wherein:
    after internal reflection, the internally reflected light exceeds a critical angle within the wedge and passes through the air interface to illuminate the keypad.

11. An electronic device according to claim 3 wherein:
    after internal reflection, the internally reflected light exceeds a critical angle within the wedge and passes through the air interface to illuminate the keypad.

12. An electronic device according to claim 4 wherein:
    after internal reflection, the internally reflected light exceeds a critical angle within the wedge and passes through the air interface to illuminate the keypad.

13. An electronic device according to claim 5 wherein:
    after internal reflection, the internally reflected light exceeds a critical angle within the wedge and passes through the air interface to illuminate the keypad.

14. An electronic device according to claim 6 wherein:
    after internal reflection, the internally reflected light exceeds a critical angle within the wedge and passes through the air interface to illuminate the keypad.

15. An electronic device according to claim 7 wherein:
    after internal reflection, the internally reflected light exceeds a critical angle within the wedge and passes through the air interface to illuminate the keypad.

16. An electronic device according to claim 8 wherein:
    after internal reflection, the internally reflected light exceeds a critical angle within the wedge and passes through the air interface to illuminate the keypad.

* * * * *